US010683422B2

(12) United States Patent
Mariotti et al.

(10) Patent No.: US 10,683,422 B2
(45) Date of Patent: Jun. 16, 2020

(54) ROAD BITUMEN PELLETS

(71) Applicant: TOTAL MARKETING SERVICES, Puteaux (FR)

(72) Inventors: Sophie Mariotti, Lyons (FR); Regis Vincent, Grigny (FR)

(73) Assignee: TOTAL MARKETING SERVICES, Puteaux (FR)

( * ) Notice: Subject to any disclaimer, the term of this patent is extended or adjusted under 35 U.S.C. 154(b) by 0 days.

(21) Appl. No.: 15/501,121

(22) PCT Filed: Jul. 29, 2015

(86) PCT No.: PCT/EP2015/067407
§ 371 (c)(1),
(2) Date: Feb. 1, 2017

(87) PCT Pub. No.: WO2016/016318
PCT Pub. Date: Feb. 4, 2016

(65) Prior Publication Data
US 2017/0226320 A1 Aug. 10, 2017

(30) Foreign Application Priority Data
Aug. 1, 2014 (FR) .................................... 14 57538

(51) Int. Cl.
| | |
|---|---|
| *C08L 95/00* | (2006.01) |
| *C08K 5/09* | (2006.01) |
| *C08K 5/16* | (2006.01) |
| *C08K 3/34* | (2006.01) |
| *C08K 3/40* | (2006.01) |
| *C08K 5/092* | (2006.01) |
| *C08K 5/25* | (2006.01) |
| *C07G 1/00* | (2011.01) |
| *E01C 7/18* | (2006.01) |

(52) U.S. Cl.
CPC ............ *C08L 95/00* (2013.01); *C08K 3/34* (2013.01); *C08K 3/40* (2013.01); *C08K 5/09* (2013.01); *C08K 5/092* (2013.01); *C08K 5/16* (2013.01); *C08K 5/25* (2013.01); *C07G 1/00* (2013.01); *C08L 2555/22* (2013.01); *C08L 2555/40* (2013.01); *C08L 2555/60* (2013.01); *C08L 2555/80* (2013.01); *E01C 7/18* (2013.01)

(58) Field of Classification Search
CPC ...... C08L 95/00; C08L 91/00; C08L 2555/00; C08L 2555/22; C08L 2555/52; C08L 2555/60; C09D 195/00; C10C 3/00; C08K 5/00; C08K 5/17; C08K 5/21; C08K 5/205; C08K 5/24; C08K 5/25; C08K 5/27; C08K 3/34; C08K 3/40; E01C 7/00; E01C 7/18; E01C 7/187; E01C 9/086; E01C 19/08; E01C 19/10; E01C 19/1004; E01C 19/45
See application file for complete search history.

(56) References Cited

U.S. PATENT DOCUMENTS

| | | | | |
|---|---|---|---|---|
| 2,387,514 | A | | 10/1945 | Holmes |
| 3,026,568 | A | | 3/1962 | Moar |
| 3,483,153 | A | * | 12/1969 | Pitchford ................ C10C 3/026 106/269 |
| 4,769,288 | A | | 9/1988 | Saylak |
| 5,254,385 | A | * | 10/1993 | Hazlett ............... C04B 20/1029 428/402.24 |
| 6,011,094 | A | * | 1/2000 | Planche .................. C08L 95/00 524/68 |
| 2007/0027235 | A1 | * | 2/2007 | Marchal .................. C08L 23/02 524/59 |
| 2009/0137705 | A1 | * | 5/2009 | Faucon Dumont ..... C04B 26/26 524/71 |
| 2010/0192804 | A1 | * | 8/2010 | Lapalu ................. C08K 5/0008 106/277 |

(Continued)

FOREIGN PATENT DOCUMENTS

| | | |
|---|---|---|
| CA | 2178053 A1 | 12/1996 |
| DE | 2438330 A1 | 2/1976 |

(Continued)

OTHER PUBLICATIONS

Sep. 17, 2015 Written Opinion issued in International Patent Application No. PCT/EP215/067407.

(Continued)

*Primary Examiner* — Alexandra M Moore
(74) *Attorney, Agent, or Firm* — Oliff PLC

(57) ABSTRACT

Bitumen pellets including at least one chemical additive chosen from: a compound of general formula (I): R1-(COOH)z in which R1 is a linear or branched, saturated or unsaturated hydrocarbon-based chain including from 4-68 carbon atoms, and z is an integer ranging from a compound of general formula (II): R—(NH)nCONH—(X)m-NHCO(NH)n-R' in which: R and R' are identical or different, contain a saturated or unsaturated, linear or branched, cyclic or acyclic hydrocarbon-based chain having from 1-22 carbon atoms and optionally including heteroatoms and/or rings having from 3-12 atoms and/or heterocycles having from 3-12 atoms; X contains a saturated or unsaturated, linear or branched, cyclic or acyclic hydrocarbon-based chain having from 1-22 carbon atoms and optionally including one or more heteroatoms and/or rings having from 3-12 atoms and/or heterocycles having from 3-12 atoms; n and m are integers having, independently of one another, a value of 0 or of 1.

26 Claims, No Drawings

(56) References Cited

U.S. PATENT DOCUMENTS

| | | | | |
|---|---|---|---|---|
| 2010/0273915 A1* | 10/2010 | Choen | ............... | C08L 95/00 |
| | | | | 523/351 |
| 2011/0233105 A1* | 9/2011 | Bailey | ............... | C09D 195/00 |
| | | | | 206/525 |
| 2011/0290695 A1* | 12/2011 | Thomas | ............... | C08L 95/00 |
| | | | | 206/524.1 |
| 2013/0008348 A1* | 1/2013 | Sockwell | ............... | C04B 26/26 |
| | | | | 106/668 |
| 2013/0041075 A1* | 2/2013 | Harders | ............... | C08L 95/00 |
| | | | | 524/68 |
| 2014/0147205 A1* | 5/2014 | Strickland | ............... | C08L 95/00 |
| | | | | 404/75 |
| 2015/0183994 A1 | 7/2015 | Basset et al. | | |
| 2015/0307713 A1 | 10/2015 | Krafft et al. | | |

FOREIGN PATENT DOCUMENTS

| | | |
|---|---|---|
| FR | 2998896 A1 | 6/2014 |
| WO | 2014/005935 A1 | 1/2014 |

OTHER PUBLICATIONS

Connan et al., "Archaeological Bitumen: Identification, Origins, and Uses of an Ancient Near Eastern Material", Materials Research Society, vol. 267, pp. 683-720, 1992.

Cramp et al., "Molecules From The Past Archaeology Meets Chemistry", Catalyst, pp. 1-4, 2010.

Sep. 17, 2015 International Search Report issued in International Patent Application No. PCT/EP2015/067407.

Piwu Pan, "Fundamentals of Petroleum Measurement Technique," May 31, 2011, pp. 772.

* cited by examiner

ROAD BITUMEN PELLETS

TECHNICAL FIELD

The present invention relates to pellets of road bitumen. The present invention also relates to a process for transporting and/or storing road bitumen under cold conditions in granular form, to the use of the pellets according to the invention as road binder, to the use thereof for manufacturing mixes and also to a process for manufacturing mixes from bitumen pellets according to the invention.

PRIOR ART

The vast majority of bitumen is used in construction, mainly for the manufacture of road carriageways or in industry, for example for roofing applications. It is generally in the form of a black material which is highly viscous, or even solid at ambient temperature, and which liquefies when heated. Generally, bitumen is stored and transported under hot conditions, in bulk, in tanker trucks or by boats at high temperatures of about 120° C. to 160° C. However, the storage and transportation of bitumen under hot conditions has certain drawbacks. Firstly, the transportation of bitumen under hot conditions in liquid form is considered to be dangerous and it is highly restricted from a regulatory point of view. This mode of transportation does not present particular difficulties when the transportation equipment and infrastructures are in good condition. If this is not the case, it can become problematic: if the tanker truck is not sufficiently lagged, the bitumen may become viscous during an excessively long trip. Bitumen delivery distances are therefore limited. Secondly, maintaining bitumen at high temperatures in tanks or in tanker trucks consumes energy. In addition, maintaining bitumen at high temperatures for a long period of time can affect the properties of the bitumen and thus change the final performance levels of the mix.

In order to overcome the problems of transporting and storing bitumen under hot conditions, solutions for transportation and storage in packaging under cold conditions have been developed. This mode of transportation of bitumen in packaging under cold conditions represents only a minimal fraction of the amounts transported throughout the world, but it corresponds to very real needs for geographic regions which are difficult and expensive to access using conventional transportation means.

By way of example of transportation under cold conditions currently used, mention may be made of transporting bitumen at ambient temperature in metal barrels. This means is increasingly questionable from an environmental point of view since the cold bitumen stored in the barrels must be reheated before it is used as road binder. However, this operation is difficult to carry out for this type of packaging and the barrels constitute waste after use. Furthermore, the storage of bitumen under cold conditions in barrels results in losses since the bitumen is very viscous and a part of the product remains on the walls of the barrel when the bitumen is transferred into the tanks of mix production units. With regard to the handling and transportation of bituminous products in these barrels, they can prove to be difficult and dangerous if the specialized equipment for handling the barrels is not available in the transporters or at the site where the bitumen is used.

By way of other examples, mention may be made of bitumens in the form of pellets transported in bags. These pellets have the advantage of being easy to handle. U.S. Pat. No. 3,026,568 describes bitumen pellets covered with a powdery material, such as calcium carbonate powder. Nevertheless, the bitumen pellets tend to adhere to one another and to agglomerate during their storage and/or their transport, especially at high ambient temperatures and over long periods.

There is a need to provide a road bitumen which can be transported and/or stored under cold conditions, making it possible to overcome the drawbacks of the prior art.

In particular, the aim of the present invention is to provide a road bitumen which can be transported and/or stored at high ambient temperatures, especially at a temperature of less than 100° C., preferably between 20° C. and 90° C.

Another aim of the invention is to propose a road bitumen which can be handled easily, especially at high ambient temperatures, in particular at a temperature of less than 100° C., preferably between 20° C. and 90° C.

Another aim of the invention is to propose an ecological and economical process for transporting road bitumen and avoiding the use of additional means for maintaining the temperature of said bitumen during transport and/or storage.

Another aim of the invention is to propose an improved process for transportation and/or storage under cold conditions.

Another aim of the invention is to propose an ecological process which makes it possible to minimize the presence of waste and/or residues.

SUBJECT OF THE INVENTION

The subject of the invention relates to bitumen pellets comprising at least one chemical additive chosen from:

a compound of general formula (I): $R^1$—$(COOH)_z$ in which $R^1$ is a linear or branched, saturated or unsaturated hydrocarbon-based chain comprising from 4 to 68 carbon atoms, preferably from 4 to 54 carbon atoms, more preferentially from 4 to 36 carbon atoms, and z is an integer ranging from 1 to 4, preferably from 2 to 4, and a compound of general formula (II): R—$(NH)_n$CONH—$(X)_m$—NHCO$(NH)_n$—R' in which:

R and R', which are identical or different, contain a saturated or unsaturated, linear or branched, cyclic or acyclic hydrocarbon-based chain having from 1 to 22 carbon atoms and optionally comprising heteroatoms and/or rings having from 3 to 12 atoms and/or heterocycles having from 3 to 12 atoms;

X contains a saturated or unsaturated, linear or branched, cyclic or acyclic hydrocarbon-based chain having from 1 to 22 carbon atoms and optionally comprising one or more heteroatoms and/or rings having from 3 to 12 atoms and/or heterocycles having from 3 to 12 atoms;

n and m are integers having, independently of one another, a value of 0 or of 1.

According to a particular embodiment, the chemical additive is a compound of general formula (I): $R^1$—$(COOH)_z$ in which $R^1$ is a linear or branched, saturated or unsaturated hydrocarbon-based chain comprising from 4 to 68 carbon atoms, preferably from 4 to 54 carbon atoms, more preferentially from 4 to 36 carbon atoms, and z is an integer ranging from 1 to 4, preferably from 2 to 4.

According to a particular preferential embodiment, the compound is a diacid of general formula HOOC—$C_wH_{2w}$—COOH, in which w is an integer ranging from 4 to 22, preferably from 4 to 12.

Advantageously, the compound is a diacid chosen from the group consisting of adipic acid, pimelic acid, suberic acid, azelaic acid, sebacic acid, undecanedioic acid, 1,2-dodecanedioic acid and tetradecanedioic acid.

According to a particular embodiment, the chemical additive is a compound of general formula (II):
R—(NH)$_n$CONH—(X)$_m$—NHCO(NH)$_n$—R' in which:

R and R', which are identical or different, contain a saturated or unsaturated, linear or branched, cyclic or acyclic hydrocarbon-based chain having from 1 to 22 carbon atoms, optionally comprising heteroatoms and/or rings having from 3 to 12 atoms and/or heterocycles having from 3 to 12 atoms;

X contains a saturated or unsaturated, linear or branched, cyclic or acyclic hydrocarbon-based chain having from 1 to 22 carbon atoms and optionally comprising one or more heteroatoms and/or rings having from 3 to 12 atoms and/or heterocycles having from 3 to 12 atoms;

n and m are integers having, independently of one another, a value of 0 or of 1.

According to a particular preferential embodiment, the compound comprises a hydrazide unit when n and m have a value of 0.

Advantageously, the R and/or R' groups, which are identical or different, comprise one or more aromatic monocyclic or polycyclic rings or heterocycles, optionally substituted by one or more hydroxyl functions and/or one or more saturated, linear or branched hydrocarbon-based chains, having from 1 to 6 carbon atoms.

According to a particular preferential embodiment, the compound comprises two amide units when n has a value of 0 and m has a value of 1.

According to a particular preferential embodiment, the R and/or R' groups, which are identical or different, comprise an aliphatic hydrocarbon-based chain having 4 to 22 carbon atoms, especially chosen from the groups $C_4H_9$, $C_5H_{11}$, $C_9H_{19}$, $C_{11}H_{23}$, $C_{12}H_{25}$, $C_{17}H_{35}$, $C_{18}H_{37}$, $C_{21}H_{43}$, $C_{22}H_{45}$.

According to a particular preferential embodiment, the X group comprises an aliphatic hydrocarbon-based chain having 1 to 2 carbon atoms.

According to one particular embodiment, the bitumen pellets comprise from 0.1% to 5% by weight, preferably from 0.5% to 4% by weight, more preferentially from 0.5% to 2.5% by weight of chemical additive relative to the total weight of said pellets.

According to one particular embodiment, the pellets also comprise at least one olefinic polymer adjuvant, functionalized by at least glycidyl functional groups.

According to a particular preferential embodiment, the olefinic polymer adjuvant is chosen from the group consisting of:
(a) random or block copolymers of ethylene and of a monomer chosen from glycidyl acrylate and glycidyl methacrylate, comprising from 50% to 99.7% by weight of ethylene;
(b) random or block terpolymers of ethylene, of a monomer A chosen from vinyl acetate and $C_1$ to $C_6$ alkyl acrylates or methacrylates and of a monomer B chosen from glycidyl acrylate and glycidyl methacrylate, comprising from 0.5% to 40% by weight of units derived from the monomer A and from 0.5% to 15% by weight of units derived from the monomer B, the remainder being formed of units derived from the ethylene; and
(c) copolymers resulting from the grafting of a monomer B, chosen from glycidyl acrylate and glycidyl methacrylate, to a substrate consisting of a polymer chosen from polyethylenes, polypropylenes, random or block copolymers of ethylene and of vinyl acetate and random or block copolymers of ethylene and of $C_1$ to $C_6$ alkyl acrylate or methacrylate, comprising from 40% to 99.7% by weight of ethylene, said grafted copolymers comprising from 0.5% to 15% by weight of grafted units derived from the monomer B.

According to a particular preferential embodiment, the olefinic polymer adjuvant is chosen from the terpolymers (b).

Advantageously, the olefinic polymer adjuvant is chosen from the random terpolymers.

According to one particular embodiment, the pellets comprise from 0.05% to 15% by weight, preferably from 0.1% to 10% by weight, more preferentially from 0.5% to 5% by weight of the olefinic polymer adjuvant relative to the total weight of said pellets.

According to one particular embodiment, the pellets also comprise at least one anti-agglomerating agent, preferably of mineral or organic origin.

Preferably, the anti-agglomerating agent is chosen from talc; fines generally with a diameter of less than 125 μm with the exception of calcium carbonate fines, such as siliceous fines; sand, such as Fontainebleau sand; cement; carbon; wood residues such as lignin, lignosulphonate, conifer needle powders and conifer cone powders, especially of pine; glass powder; clays such as kaolin, bentonite, vermiculite; alumina such as alumina hydrates; silica; silica derivatives such as silicates, silicon hydroxides and silicon oxides; plastic powder; lime; plaster; rubber powder; powder of polymers such as styrene-butadiene copolymers (SB), styrene-butadiene-styrene copolymers (SBS); and mixtures thereof.

Advantageously, the anti-agglomerating agent is chosen from talc; fines generally with a diameter of less than 125 μm with the exception of calcium carbonate fines, such as siliceous fines; wood residues such as lignin, lignosulphonate, conifer needle powders and conifer cone powders, especially of pine; glass powder; sand, such as Fontainebleau sand; and mixtures thereof.

According to one particular embodiment, the pellets are covered over at least a portion of their surface with an anti-agglomerating agent, preferably of mineral or organic origin.

Preferably, the anti-agglomerating agent is chosen from talc; fines generally with a diameter of less than 125 μm with the exception of calcium carbonate fines, such as siliceous fines; sand, such as Fontainebleau sand; cement; carbon; wood residues such as lignin, lignosulphonate, conifer needle powders and conifer cone powders, especially of pine; glass powder; clays such as kaolin, bentonite, vermiculite; alumina such as alumina hydrates; silica; silica derivatives such as silicates, silicon hydroxides and silicon oxides; plastic powder; lime; plaster; rubber powder; powder of polymers such as styrene-butadiene copolymers (SB), styrene-butadiene-styrene copolymers (SBS); and mixtures thereof.

Advantageously, the anti-agglomerating agent is chosen from talc; fines generally with a diameter of less than 125 μm with the exception of calcium carbonate fines, such as siliceous fines; wood residues such as lignin, lignosulphonate, conifer needle powders and conifer cone powders, especially of pine; glass powder; sand, such as Fontainebleau sand; and mixtures thereof.

According to a particular preferential embodiment, the anti-agglomerating agent is talc.

Another subject of the invention also relates to a process for transporting and/or storing road bitumen under cold conditions, said road bitumen being transported and/or stored in the form of bitumen pellets as described above.

The term "road bitumen" is intended to mean bituminous compositions consisting of one or more bitumen bases and comprising one or more chemical additives, said compositions being intended for a road application.

The term "road bitumen" is also intended to mean bituminous compositions comprising one or more bitumen bases, one or more chemical additives and one or more anti-agglomerating agents, said chemical compositions being intended for a road application.

The term "bitumen pellet" is intended to mean pellets of bitumen formed from road bitumen according to the invention.

According to one particular embodiment, the road bitumen is transported and/or stored at a temperature of less than 100° C., preferably at an ambient temperature of less than 100° C. In particular, the temperature of transportation and/or storage corresponds to the ambient temperature. "Ambient temperature" is intended to mean the temperature which is reached during transportation and/or storage of the bitumen according to the invention, without said bitumen being heated by any type of process. Thus, the ambient temperature may reach high temperatures, less than 100° C. during summer periods, in particular in geographical regions with a hot climate.

According to a particular preferential embodiment, the road bitumen is transported and/or stored at an ambient temperature of between 20° C. and 90° C., preferably of between 20° C. and 80° C., more preferentially of between 40° C. and 80° C., even more preferentially of between 50° C. and 70° C., even more preferentially of between 40° C. and 60° C.

Another subject of the invention also relates to the use of bitumen pellets as road binder, said bitumen pellets being as described above.

According to one particular embodiment, the bitumen pellets are used for manufacturing mixes, said pellets being as described above.

Another subject of the invention also relates to a process for manufacturing mixes comprising at least one road binder and aggregates, the road binder being chosen from the bitumen pellets according to the invention, this process comprising at least the steps of:

heating the aggregates to a temperature ranging from 100° C. to 180° C., preferably from 120° C. to 160° C.

mixing the aggregates with the road binder in a tank such as a mixer or a mixing drum, obtaining mixes.

According to one particular embodiment, the process for manufacturing mixes does not comprise a step of heating the road binder before it is mixed with the aggregates.

DETAILED DESCRIPTION

According to a particular embodiment, the bitumen pellets are prepared from road bitumen, said road bitumen being prepared by bringing into contact:

one or more bitumen bases, and between 0.1% and 5% by weight, preferably between 0.5% and 4% by weight and more preferentially between 0.5% and 2.5% by weight of a chemical additive.

Throughout the remainder of the description, the percentages by weight are calculated relative to the total weight of the road bitumen.

The operation is carried out at manufacturing temperatures of between 100° C. and 200° C., preferably between 140° C. and 200° C. and more preferentially between 140° C. and 170° C., and with stirring for a period of time of at least 10 minutes, preferably of between 30 minutes and 10 hours and more preferably between 1 hour and 6 hours.

The term "manufacturing temperature" is intended to mean the temperature to which the bitumen base(s) is (are) heated before mixing and also the mixing temperature. The heating temperature and time vary according to the amount of bitumen used and are defined by standard NF EN 12594.

Among the bitumen bases that can be used according to the invention, mention may be made first of all of bitumens of natural origin, those contained in natural bitumen or natural asphalt deposits or bituminous sands and bitumens originating from the refining of crude oil. The bitumen bases according to the invention are advantageously chosen from bitumen bases originating from the refining of crude oil. The bitumen bases may be chosen from bitumen bases or mixtures of bitumen bases originating from the refining of crude oil, in particular bitumen bases containing asphaltenes. The bitumen bases can be obtained by conventional processes for manufacturing bitumen bases in refining, in particular by direct distillation and/or vacuum distillation of oil. These bitumen bases can optionally be visbroken and/or deasphalted and/or air-rectified. The various bitumen bases obtained by means of refining processes can be combined with one another to obtain the best technical compromise. The bitumen base may also be a bitumen base from recycling. The bitumen bases may be bitumen bases of hard grade or of soft grade. The bitumen bases according to the invention have a penetrability, measured at 25° C. according to standard EN 1426, of between 5 and 300 ¹⁄₁₀ mm, preferably between 10 and 100 ¹⁄₁₀ mm, more preferentially between 30 and 100 ¹⁄₁₀ mm.

According to a particular embodiment, the chemical additive may be a compound of the following general formula (I):

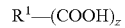

$$R^1—(COOH)_z$$

in which $R^1$ is a linear or branched, saturated or unsaturated hydrocarbon-based chain comprising from 4 to 68 carbon atoms, preferably from 4 to 54 carbon atoms, more preferentially from 4 to 36 carbon atoms, and z is an integer ranging from 1 to 4, preferably from 2 to 4, more preferentially equal to 2.

The chemical additives corresponding to the formula (I) may advantageously be monoacids (z=1), diacids (z=2), triacids (z=3) or tetraacids (z=4). The preferred chemical additives are diacids with z=2. Similarly, the $R^1$ group is preferably a linear and saturated hydrocarbon-based chain of formula $C_wH_{2w}$ with w an integer ranging from 4 to 22, preferably from 4 to 12.

The chemical additives have, in particular, the general formula $HOOC—C_wH_{2w}—COOH$, where w is an integer ranging from 4 to 22, preferably from 4 to 12. These chemical additives correspond to the above formula (I) in which z=2 and $R^1=C_wH_{2w}$.

The preferred diacids are as follows:

adipic acid or 1,6-hexanedioic acid, with w=4
pimelic acid or 1,7-heptanedioic acid, with w=5
suberic acid or 1,8-octanedioic acid, with w=6
azelaic acid or 1,9-nonanedioic acid, with w=7
sebacic acid or 1,10-decanedioic acid, with w=8
undecanedioic acid, with w=9
1,2-dodecanedioic acid, with w=10
tetradecanedioic acid, with w=12

Advantageously, the diacid is sebacic acid.

The diacids may also be diacid dimers of unsaturated fatty acid(s), i.e. dimers formed from at least one unsaturated fatty acid, for example from a single unsaturated fatty acid or from two different unsaturated fatty acids. The diacid dimers of unsaturated fatty acid(s) are conventionally obtained by intermolecular dimerization reaction of at least one unsaturated fatty acid (Diels-Alder reaction for example). Preferably, a single type of unsaturated fatty acid is dimerized. They derive in particular from the dimerization of an unsaturated fatty acid which is especially $C_8$ to $C_{34}$, especially $C_{12}$ to $C_{22}$, in particular $C_{16}$ to $C_{20}$, and more particularly $C_{18}$. A preferred fatty acid dimer is obtained by dimerization of linoleic acid, it being possible for the latter to be subsequently partially or totally hydrogenated. Another preferred fatty acid dimer has the formula HOOC—$(CH_2)_7$—CH=CH—$(CH_2)_7$—COOH. Another preferred fatty acid dimer is obtained by dimerization of methyl linoleate. In the same way, it is possible to have fatty acid triacids and fatty acid tetraacids, obtained respectively by trimerization and tetramerization of at least one fatty acid.

According to another particular embodiment, the chemical additive may be a compound of the following general formula (II):

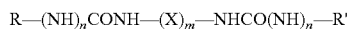

in which:

R and R', which are identical or different, contain a saturated or unsaturated, linear or branched, cyclic or acyclic hydrocarbon-based chain having from 1 to 22 carbon atoms and optionally comprising heteroatoms and/or rings having from 3 to 12 atoms and/or heterocycles having from 3 to 12 atoms;

X contains a saturated or unsaturated, linear or branched, cyclic or acyclic hydrocarbon-based chain having from 1 to 22 carbon atoms and optionally comprising one or more heteroatoms and/or rings having from 3 to 12 atoms and/or heterocycles having from 3 to 12 atoms;

n and m are integers having, independently of one another, a value of 0 or of 1.

According to a variant of the invention, the integer m has a value of 0. In this particular case, the R—$(NH)_n$CONH and NHCO$(NH)_n$—R' groups are covalently bonded to one another via a hydrazide linkage CONH—NHCO. The R and/or R' groups, which are identical or different, then comprise a group chosen from at least one hydrocarbon-based chain having at least 4 carbon atoms, at least one aliphatic ring having 3 to 8 atoms, at least one aliphatic, partially aromatic or entirely aromatic fused polycyclic system, each ring comprising 5 or 6 atoms, taken alone or in a mixture.

Preferably, the R and/or R' groups, which are identical or different, are linear saturated hydrocarbon-based chains comprising from 4 to 22 carbon atoms. Among the preferred linear saturated hydrocarbon-based chains, mention may be made of the $C_4H_9$, $C_6H_{11}$, $C_9H_{19}$, $C_{11}H_{23}$, $C_{12}H_{25}$, $C_{17}H_{35}$, $C_{18}H_{37}$, $C_{21}H_{43}$, $C_{22}H_{45}$ groups.

According to another variant of the invention, the integer m has a value of 1. The R group, the R' group and/or the X group then comprise a group chosen from at least one hydrocarbon-based chain having at least 4 carbon atoms, at least one aliphatic ring having 3 to 8 atoms, at least one aliphatic, partially aromatic or entirely aromatic fused polycyclic system, each ring comprising 5 or 6 atoms, taken alone or in a mixture.

Preferably, the X group represents a saturated, linear hydrocarbon-based chain comprising from 1 to 22 carbon atoms. Preferably, the X group is chosen from $C_2H_4$ and $C_3H_6$ groups.

The X group may also be a cyclohexyl group or a phenyl group, the R—$(NH)_n$CONH— and NHCO$(NH)_n$—R'— radicals may then be in the ortho, meta or para position. Moreover, they may be in the cis or trans position with respect to one another. Furthermore, when the X radical is cyclic, this ring may be substituted with groups other than the two main groups R$(NH)_n$CONH— and NHCO$(NH)_n$—R'.

The X group may also comprise two or more aliphatic and/or aromatic, fused or non-fused rings. Thus, according to a preferred variant of the invention, the X group is a group comprising two aliphatic rings linked via a $CH_2$ group which is optionally substituted, such as, for example:

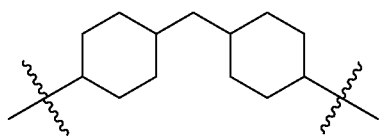 [SMILES: *C1CCC(CC2CCC(*)CC2)CC1]

According to another variant of the invention, the X group is a group comprising two aromatic rings linked via a $CH_2$ group which is optionally substituted, such as, for example:

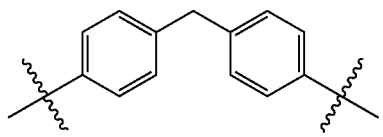 [SMILES: *c1ccc(Cc2ccc(*)cc2)cc1]

Other particular compounds are ureide derivatives, including a particular urea, 4,4'-bis(dodecylaminocarbonylamino)diphenylmethane, which has the formula:

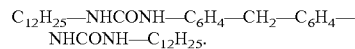

According to a particular preferred embodiment, the chemical additive is a compound of general formula (II), in which the integer n has a value of 0.

Among the compounds preferred according to the invention, mention may be made of the hydrazide derivatives corresponding to the following formulae:

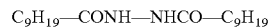

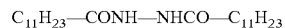

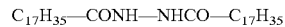

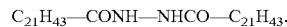

Mention may also be made of the diamides, a preferred diamide of which is N,N'-ethylenedi(stearamide), $C_{17}H_{35}$—CONH—$CH_2$—$CH_2$—NHCO—$C_{17}H_{35}$.

As hydrazide derivative, mention may also be made of 2',3-bis[[3-[3,5-di-tert-butyl-4-hydroxyphenyl]propionyl]] propionohydrazide.

According to one particular embodiment, the bitumen pellets comprise from 0.1% to 5% by weight, preferably from 0.5% to 4% by weight, more preferentially from 0.5% to 2.5% by weight of the chemical additive relative to the total weight of said pellets.

According to another particular embodiment, the pellets are prepared from a road bitumen, said road bitumen being prepared by bringing into contact:

one or more bitumen bases, between 0.1% and 5% by weight, preferably between 0.5% and 4% by weight and more preferentially between 0.5% and 2.5% by weight of a chemical additive, and between 0.05% and 15% by weight, preferably between 0.1% and 10% by weight and more preferentially between 0.5% and 6% by weight of an olefinic polymer adjuvant.

The bitumen base and the chemical additive are as described above.

The olefinic polymer adjuvant is preferably chosen from the group consisting of (a) ethylene/glycidyl (meth)acrylate copolymers; (b) ethylene/monomer A/monomer B terpolymers and (c) copolymers resulting from the grafting of a monomer B to a polymer substrate.

(a) The ethylene/glycidyl (meth)acrylate copolymers are advantageously chosen from random or block, preferably random, copolymers of ethylene and of a monomer chosen from glycidyl acrylate and glycidyl methacrylate, comprising from 50% to 99.7% by weight, preferably from 60% to 95% by weight and more preferentially from 60% to 90% by weight of ethylene.

(b) The terpolymers are advantageously chosen from random or block, preferably random, terpolymers of ethylene, of a monomer A and of a monomer B.

The monomer A is chosen from vinyl acetate and $C_1$ to $C_6$ alkyl acrylates or methacrylates.

The monomer B is chosen from glycidyl acrylate and glycidyl methacrylate.

The ethylene/monomer A/monomer B terpolymers comprise from 0.5% to 40% by weight, preferably from 5% to 35% by weight, more preferentially from 10% to 30% by weight of units derived from the monomer A and from 0.5% to 15% by weight, preferably from 2.5% to 15% by weight of units derived from the monomer B, the remainder being formed of units derived from the ethylene.

(c) The copolymers result from the grafting of a monomer B, chosen from glycidyl acrylate and glycidyl methacrylate, to a polymer substrate. The polymer substrate consists of a polymer chosen from polyethylenes, especially low-density polyethylenes, polypropylenes, random or block, preferably random, copolymers of ethylene and of vinyl acetate and random or block, preferably random, copolymers of ethylene and of $C_1$ to $C_6$ alkyl acrylate or methacrylate, comprising from 40% to 99.7% by weight and preferably from 50% to 99% by weight of ethylene. Said grafted copolymers comprise from 0.5% to 15% by weight, preferably from 2.5% to 15% by weight of grafted units derived from the monomer B.

The olefinic polymer adjuvant is preferably chosen from the ethylene/monomer A/monomer B terpolymers (b) described above.

Advantageously, the olefinic polymer adjuvant is chosen from random terpolymers of ethylene, of a monomer A chosen from $C_1$ to $C_e$ alkyl acrylates or methacrylates and of a monomer B chosen from glycidyl acrylate and glycidyl methacrylate, comprising from 0.5% to 40% by weight, preferentially from 5% to 35% by weight and more preferentially from 10% to 30% by weight of units derived from the monomer A and from 0.5% to 15% by weight and preferably from 2.5% to 15% by weight of units derived from the monomer B, the remainder being formed of units derived from the ethylene.

According to one particular embodiment, the bitumen pellets comprise from 0.05% to 15% by weight, preferably from 0.1% to 10% by weight, more preferably from 0.5% to 6% by weight of the olefinic polymer adjuvant relative to the total weight of said pellets.

The amounts of the chemical additive and optionally of the olefinic polymer adjuvant are adjusted as a function of the nature preferably the bitumen base(s) used. In particular, the penetrability targeted for the bitumen pellets is preferably between 20 and 45 1/10 mm and/or the ring and ball softening temperature (RBT) targeted is preferably greater than 90° C., it being understood that the penetrability is measured at 25° C. according to standard EN 1426 and the RBT according to standard EN 1427.

According to a particular preferred embodiment, the road bitumen comprises a combination of the chemical additive of formula (II) and the olefinic polymer adjuvant, both described above.

The combination in which the chemical additive is of formula (II), where m=0, more preferentially where m=0 and n=0, will be preferred.

The combination in which the olefinic polymer adjuvant is chosen from the ethylene/monomer A/monomer B terpolymers (b) described above, will also be preferred.

More preferentially, the road bitumen comprises the chemical additive of formula (II), where m=0, more preferentially where m=0 and n=0, and the olefinic polymer adjuvant chosen from the ethylene/monomer A/monomer B terpolymers (b) described above.

According to one embodiment of the invention, the bitumen pellets also comprise at least one anti-agglomerating agent, preferably of mineral or organic origin.

Preferably, the anti-agglomerating agent is chosen from talc; fines generally with a diameter of less than 125 μm with the exception of calcium carbonate fines, such as siliceous fines; sand, such as Fontainebleau sand; cement; carbon; wood residues such as lignin, lignosulphonate, conifer needle powders and conifer cone powders, especially of pine; glass powder; clays such as kaolin, bentonite, vermiculite; alumina such as alumina hydrates; silica; silica derivatives such as silicates, silicon hydroxides and silicon oxides; plastic powder; lime; plaster; rubber powder; powder of polymers such as styrene-butadiene copolymers (SB), styrene-butadiene-styrene copolymers (SBS); and mixtures thereof.

Advantageously, the anti-agglomerating agent is chosen from talc; fines generally with a diameter of less than 125 μm with the exception of calcium carbonate fines, such as siliceous fines; wood residues such as lignin, lignosulphonate, conifer needle powders and conifer cone powders, especially of pine; glass powder; sand, such as Fontainebleau sand; and mixtures thereof.

Preferably, the bitumen pellets also comprise between 0.5% and 20% by weight, preferably between 2% and 20% by weight, more preferentially between 4% and 15% by weight of the anti-agglomerating agent relative to the total weight of bitumen of said pellets.

In this embodiment, the bitumen pellets are prepared from road bitumen, said road bitumen being prepared by bringing into contact:

one or more bitumen bases, between 0.1% and 5% by weight, preferably between 0.5% and 4% by weight, more preferentially between 0.5% and 2.5% by weight of a chemical additive relative to the total weight of bitumen of said pellets, and between 0.5% and 20% by weight, preferably between 2% and 20% by weight, more preferentially between 4% and 15% by weight of the anti-agglomerating agent relative to the total weight of bitumen of said pellets.

The road bitumen as described above may also contain other known additives or other known elastomers for bitumen, such as the copolymers SB (copolymer comprising styrene and butadiene blocks), SBS (copolymer comprising styrene-butadiene-styrene blocks), SIS (styrene-isoprene-styrene), SBS* (star copolymer comprising styrene-butadiene-styrene blocks), SBR (styrene-b-butadiene-rubber) or EPDM (ethylene propylene diene modified). These elastomers may also be crosslinked according to any known process, for example with sulphur. Mention may also be made of elastomers produced from styrene monomers and from butadiene monomers allowing crosslinking without crosslinking agent, as described in documents WO 2007/058994 and WO 2008/137394 and by the applicant in patent application WO 11/013073.

According to a particular embodiment, the road bitumen consists solely of one or more bitumen bases and of one or more chemical additives as described above.

The bitumen pellets are obtained by shaping road bitumen as described above according to any known process, for example according to the manufacturing process described in document U.S. Pat. No. 3,026,568, document WO 2009/153324 or document WO 2012/168380. According to one particular embodiment, the pellets may be shaped by draining, in particular using a drum.

Other techniques may be used in the process for manufacturing the bitumen pellets, in particular moulding, extrusion, etc.

The bitumen pellets according to the invention may have, within the same population of pellets, one or more shapes chosen from cylindrical, spherical or ovoid. More specifically, the bitumen pellets according to the invention preferably have a cylindrical or spherical shape.

According to one embodiment of the invention, the size of the bitumen pellets is such that the longest average dimension is preferably less than or equal to 50 mm, more preferentially from 3 to 30 mm, even more preferentially from 5 to 20 mm.

Preferably, the bitumen pellets according to the invention have a weight of between 0.1 g and 50 g, preferably between 0.2 g and 10 g, more preferentially between 0.2 g and 5 g.

According to another embodiment of the invention, the size of the bitumen pellets is such that the longest average dimension is preferably less than 20 mm, more preferentially less than 10 mm, even more preferentially less than 5 mm. The size of the bitumen pellets can vary according to the manufacturing process used. For example, the use of a die makes it possible to control the manufacture of pellets of a chosen size. Sieving makes it possible to select pellets according to their size.

According to one particular embodiment, the bitumen pellets are covered over at least a portion of their surface with an anti-agglomerating agent, preferably over their whole surface.

The term "anti-agglomerating agent" is intended to mean any compound which limits the agglomeration and/or the adhesion of the pellets to one another during transportation thereof and/or storage thereof at ambient temperature and which ensures that they are fluid when they are handled.

Preferably, the anti-agglomerating agent is chosen from talc; fines generally with a diameter of less than 125 μm with the exception of calcium carbonate fines, such as siliceous fines; sand, such as Fontainebleau sand; cement; carbon; wood residues such as lignin, lignosulphonate, conifer needle powders and conifer cone powders, especially of pine; glass powder; clays such as kaolin, bentonite, vermiculite; alumina such as alumina hydrates; silica; silica derivatives such as silicates, silicon hydroxides and silicon oxides; plastic powder; lime; plaster; rubber powder; powder of polymers such as styrene-butadiene copolymers (SB), styrene-butadiene-styrene copolymers (SBS); and mixtures thereof.

Advantageously, the anti-agglomerating agent is chosen from talc; fines generally with a diameter of less than 125 μm with the exception of calcium carbonate fines, such as siliceous fines; wood residues such as lignin, lignosulphonate, conifer needle powders and conifer cone powders, especially of pine; glass powder; sand, such as Fontainebleau sand; and mixtures thereof.

According to a particular preferential embodiment, the anti-agglomerating agent is chosen to be talc.

Preferably, the weight of the anti-agglomerating agent covering at least a portion of the surface of the pellets is between 0.2% and 10% by weight, preferably between 0.5% and 8% by weight, more preferentially between 0.5% and 5% relative to the total weight of bitumen of said pellets, Advantageously, the weight of the anti-agglomerating agent covering at least a portion of the surface of the pellets is approximately 1% by weight relative to the total weight of bitumen of said pellets.

According to one embodiment of the invention, the anti-agglomerating agent, included in the road bitumen forming the bitumen pellets, may be identical to or different from the anti-agglomerating agent covering at least a portion of the surface of said bitumen pellets.

The layer of anti-agglomerating agent covering the bitumen pellets according to the invention is preferably continuous, so that at least 90%, preferably at least 95%, more preferentially at least 99% of the surface of the bitumen pellet is covered with an anti-agglomerating agent. The mean thickness of the layer of anti-agglomerating agent is preferably greater than or equal to 20 μm, more preferentially between 20 and 100 μm. The layer of anti-agglomerating agent must be sufficiently thick for it to be continuous.

The bitumen pellets are covered with the anti-agglomerating agent according to any known process, for example according to the process described in the document U.S. Pat. No. 3,026,568.

The subject of the invention also relates to a process for transporting and/or storing a road bitumen under cold conditions, said bitumen being transported and/or stored in the form of bitumen pellets as described above.

The term "transporting and/or storing under cold conditions" is intended to mean transportation and/or storage at a temperature of less than 100° C., preferably at an ambient temperature of less than 100° C. The temperature is preferably between 20° C. and 90° C., preferably between 20° C. and 80° C., more preferentially between 40° C. and 80° C., even more preferentially between 50° C. and 70° C., even more preferentially between 40° C. and 60° C.

The bitumen pellets are preferably transported and/or stored in bulk in bags of from 1 kg to 30 kg, or from 500 kg to 1000 kg commonly called, in the road bitumen field, "Big Bags", said bags preferably being made of hot-melt material, or in cartons of from 5 kg to 30 kg or in barrels of from 100 kg to 200 kg.

The subject of the invention also relates to the use of bitumen pellets as described above as road binder. The road binder can be used to manufacture mixes, in combination with aggregates according to any known process. The bituminous mixes are used as materials for the construction and maintenance of road foundations and their surfacing, and also for carrying out all roadworks. Mention may, for example, be made of surface coatings, hot mixes, cold mixes, cold-poured mixes, grave emulsions, base layers, bond layers, tie layers and running layers, and other combinations of a bituminous binder and of the road aggregate having particular properties, such as anti-rutting layers, draining mixes, or asphalts (mixture between a bituminous binder and aggregates of the sand type).

Another subject of the invention relates to a process for manufacturing mixes comprising at least one road binder and aggregates, the road binder being chosen from the bitumen pellets according to the invention, this process comprising at least the steps of:

heating the aggregates to a temperature ranging from 100° C. to 180° C., preferably from 120° C. to 160° C., mixing the aggregates with the road binder in a tank such as a mixer or a mixing drum, obtaining mixes.

According to one particular embodiment, the process of the invention does not comprise a step of heating the road binder before it is mixed with the aggregates.

More specifically, the process for manufacturing mixes according to the invention does not require a step of heating the bitumen pellets before mixing with the heated aggregates since, on contact with the hot aggregates, the bitumen pellets melt.

The bitumen pellets according to the invention therefore have the advantage of being able to be added directly to the hot aggregates, without having to be melted prior to the mixing with the hot aggregates.

Preferably, the step of mixing the aggregates and the road binder is carried out with stirring, and the stirring is then maintained for at most 5 minutes, preferably at most 1 minute, in order to allow a homogeneous mixture to be obtained.

The bitumen pellets according to the present invention are noteworthy in that they enable the optimum conditions for the transportation and/or storage of road bitumen under cold conditions, in particular without there being any agglomeration and/or adhesion of said pellets to one another during their transportation and/or their storage, even when the ambient temperature is high, and without degrading the properties of said road bitumen for a road application.

The various embodiments, variants, preferences and advantages described above for each of the subjects of the invention apply to all the subjects of the invention and may be taken separately or in combination.

The invention is illustrated by the following examples, given without implied limitation.

EXAMPLES

The rheological and mechanical characteristics of the bitumens to which reference is made in these examples are measured in the manner indicated in table 1.

TABLE 1

| Property | Abbreviation | Unit | Measurement standard |
|---|---|---|---|
| Needle penetrability at 25° C. | $P_{25}$ | 1/10 mm | NF EN 1426 |
| Ring-and-ball softening temperature | RBT | ° C. | NF EN 1427 |

1. Bitumens $B_2$, $B_3$, $B_4$, $B_5$, $B_6$, $B_7$, $B_9$ to $B_{15}$ and $B_{17}$ to $B_{23}$ Various bitumens $B_2$, $B_3$, $B_4$, $B_5$, $B_6$, $B_7$, $B_9$ to $B_{15}$ and $B_{17}$ to $B_{23}$ are prepared from the following products:

a bitumen base of 70/100 grade, denoted $B_0$, having a penetrability $P_{25}$ of 69 1/10 mm and an RBT of 47.6° C. and commercially available from the group TOTAL under the brand name AZALT®;

a bitumen base of 35/50 grade, denoted $B_1$, having a penetrability $P_{25}$ of 41 1/10 mm and an RBT of 52.6° C. and commercially available from the group TOTAL under the brand name AZALT®;

a bitumen base of 13/40 grade having crosslinked polymers, denoted $B_8$, having a penetrability $P_{25}$ of 47 1/10 mm and an RBT of 66.4° C. and commercially available from the group TOTAL under the brand name STYRELF®;

a bitumen base of 50/70 grade, denoted $B_{16}$, having a penetrability $P_{25}$ of 58 1/10 mm and an RBT of 49.6° C. and commercially available from the group TOTAL under the brand name AZALT®;

a styrene/butadiene diblock copolymer, denoted SB, having an amount by weight of styrene of 30% relative to the weight of the copolymer, commercially available from the company KRATON under the name D1184 A;

a Fischer-Tropsch wax, commercially available from the company SASOL under the trade name Sasobit®;

a chemical additive, 2',3-bis[[3-[3,5-di-tert-butyl-4-hydroxyphenyl]propionyl]]propionohydrazide, denoted hydrazide;

a chemical additive, sebacic acid, denoted acid;

a poly(ethylene oxide) wax, denoted PEO, commercially available from the company Honeywell;

an olefinic polymer adjuvant consisting of an ethylene/butyl acrylate/glycidyl methacrylate terpolymer, denoted E/BA/GM in proportions by weight respectively of 70/21/9 and having a melt flow rate (MFR) (190° C./2.16 kg) of 8 g/10 min, calculated according to the standard ASTM D1238-ISO1133;

siliceous fines, denoted filler;

lignin;

glass powder, denoted powder;

Fontainebleau sand, denoted sand.

The weight percentage amounts used for each bitumen are indicated in table 2 below.

TABLE 2

| | Bitumen | | | | | | | | | |
|---|---|---|---|---|---|---|---|---|---|---|
| | $B_2$ (control) | $B_3$ (control) | $B_4$ | $B_5$ | $B_6$ (control) | $B_7$ | $B_9$ | $B_{10}$ | $B_{11}$ | $B_{12}$ |
| $B_0$ | 97 | 96 | 99 | 97.7 | — | — | — | — | — | — |
| $B_1$ | — | — | — | — | 95 | 98.2 | 98.5 | — | — | — |
| $B_8$ | — | — | — | — | — | — | — | 98.5 | 99.1 | 94.5 |
| $B_{16}$ | — | — | — | — | — | — | — | — | — | — |
| Sasobit ® | 3 | — | — | — | — | — | — | — | — | — |
| PEO wax | — | 4 | — | — | — | — | — | — | — | — |
| Hydrazide | — | — | 1 | 0.5 | — | 0.8 | — | — | 0.9 | — |
| E/BA/GM | — | — | — | 1.8 | — | 1 | — | — | — | — |

TABLE 2-continued

| | | | | | | | | | | |
|---|---|---|---|---|---|---|---|---|---|---|
| Acid | — | — | — | — | — | — | 1.5 | 1.5 | — | 1.5 |
| SB | — | — | — | — | 5 | — | — | — | — | — |
| Filler | — | — | — | — | — | — | — | — | — | 4 |
| Powder | — | — | — | — | — | — | — | — | — | — |
| Sand | — | — | — | — | — | — | — | — | — | — |
| Lignin | — | — | — | — | — | — | — | — | — | — |
| $P_{25}$ (1/10 mm) | 21 | 38 | 37 | 32 | 27 | 25 | 17 | 21 | 22 | Nd |
| RBT (° C.) | 86.2 | 115 | 107 | 101 | 95 | 106 | 107 | 113 | 104 | Nd |

| | Bitumen | | | | | | | | | |
|---|---|---|---|---|---|---|---|---|---|---|
| | $B_{13}$ | $B_{14}$ | $B_{15}$ | $B_{17}$ | $B_{18}$ | $B_{19}$ | $B_{20}$ | $B_{21}$ | $B_{22}$ | $B_{23}$ |
| $B_0$ | — | — | — | — | — | — | — | — | — | — |
| $B_1$ | — | — | — | — | — | — | — | 91.5 | — | — |
| $B_8$ | 91.5 | 86.5 | 91.5 | — | — | — | — | — | — | — |
| $B_{16}$ | — | — | — | 98.5 | 94.5 | 91.5 | 86.5 | — | 91.5 | 91.5 |
| Sasobit ® | — | — | — | — | — | — | — | — | — | — |
| PEO wax | — | — | — | — | — | — | — | — | — | — |
| Hydrazide | — | — | — | — | — | — | — | — | — | — |
| E/BA/GM | — | — | — | — | — | — | — | — | — | — |
| Acid | 1.5 | 1.5 | 1.5 | 1.5 | 1.5 | 1.5 | 1.5 | 1.5 | 1.5 | 1.5 |
| SB | — | — | — | — | — | — | — | — | — | — |
| Filler | 7 | 12 | — | — | 4 | 7 | 12 | 7 | — | — |
| Powder | — | — | — | — | — | — | — | — | 7 | — |
| Sand | — | — | — | — | — | — | — | — | — | 7 |
| Lignin | — | — | 7 | — | — | — | — | — | — | — |
| $P_{25}$ (1/10 mm) | Nd | Nd | Nd | 22 | Nd | Nd | Nd | Nd | Nd | Nd |
| RBT (° C.) | Nd | Nd | Nd | 112 | Nd | Nd | Nd | Nd | Nd | Nd |

The values for $P_{25}$ (1/10 mm) and RBT (° C.) indicated as Nd were not measured because of the presence of filler, sand or powder in the bituminous composition according to the invention.

The bitumens are prepared in the following way.

For the bitumen $B_2$, the bitumen base $B_0$ is introduced into a reactor maintained at 165° C. with stirring at 300 revolutions/min. The Fischer-Tropsch wax is then introduced into the reactor. The content of the reactor is maintained at 165° C. with stirring at 300 revolutions/min for 1 hour.

The bitumen $B_3$ is prepared from the bitumen base $B_0$ and the PEO wax in the same way as the bitumen $B_2$.

For the bitumen $B_4$, the bitumen base $B_0$ is first introduced into a reactor at 160° C. with stirring at 300 revolutions/min. Then, the hydrazide is added, respectively, in the form of pellets. The mixture is stirred for approximately 1 hour at 160° C. so as to obtain a final homogeneous appearance. The mixture is cooled to ambient temperature.

For the bitumen $B_5$ according to the invention, the bitumen base $B_0$ is first introduced into a reactor at 160° C. with stirring at 300 revolutions/min. The terpolymer E/BA/GM is then added and the mixture is heated at 160° C. for approximately 2 hours. The hydrazide is then added in the form of pellets and the mixture is stirred for approximately 1 hour at 160° C. to obtain a final homogeneous appearance. The mixture is cooled to ambient temperature.

For the bitumen $B_6$, the bitumen base $B_1$ and the SB copolymer are introduced into a reactor maintained at 185° C. and with stirring at 300 revolutions/min. The content of the reactor is then maintained at 185° C. with stirring at 300 revolutions/min for 4 hours.

The bitumen $B_7$ is prepared from the bitumen base $B_1$ in the same way as the bitumen $B_5$.

The bitumen $B_9$ is prepared from the base $B_1$ in the same way as the bitumen $B_4$, using the acid in the place of the hydrazide, For the bitumen $B_{10}$, the bitumen base $B_8$ is introduced into a reactor at 160° C. with stirring at 300 revolutions/min, then the acid is added. The mixture is stirred for approximately 1 hour at 160° C. so as to obtain a final homogeneous appearance. The mixture is cooled to ambient temperature.

The bitumen $B_{11}$ is prepared like the bitumen $B_{10}$ using hydrazide in the place of the acid.

For the bitumen $B_{12}$, the bitumen base $B_8$ is introduced into a reactor maintained at 160° C. with stirring at 300 revolutions/min, then the acid is added. The mixture is stirred for approximately 1 hour at 160° C., then 4% filler is added, heated beforehand at 160° C. for 30 minutes. The mixture obtained in this way is heated at 160° C. for approximately 1 hour so as to obtain a final homogeneous appearance. The mixture is cooled to ambient temperature.

The bitumen $B_{13}$ is prepared like the bitumen $B_{12}$ using 7% filler instead of 4% filler.

The bitumen $B_{14}$ is prepared like the bitumen $B_{12}$ using 12% filler instead of 4% filler.

The bitumen $B_{15}$ is prepared like the bitumen $B_{12}$ using 7% lignin instead of 4% filler.

The bitumen $B_{17}$ is prepared from the bitumen base $B_{16}$ in the same way as the bitumen $B_9$.

For the bitumen $B_{18}$, the bitumen base $B_{16}$ is first introduced into a reactor at 160° C. with stirring at 300 revolutions/min. The acid is then added. The mixture is stirred for approximately 1 hour at 160° C., then 4% filler is added, heated beforehand at 160° C. for 30 minutes. The mixture obtained in this way is heated at 160° C. for approximately 1 hour so as to obtain a final homogeneous appearance. The mixture is cooled to ambient temperature.

The bitumen $B_{19}$ is prepared like the bitumen $B_{18}$ using 7% filler instead of 4% filler.

The bitumen $B_{20}$ is prepared like the bitumen $B_{18}$ using 12% filler instead of 4% filler.

The bitumen $B_{21}$ is prepared from the bitumen base $B_1$ in the same way as the bitumen $B_{13}$.

The bitumen $B_{22}$ is prepared from the bitumen base $B_{16}$ in the same way as the bitumen $B_{13}$, using powder in the place of the filler.

The bitumen $B_{23}$ is prepared from the bitumen base $B_{16}$ in the same way as the bitumen $B_{13}$, using sand in the place of the filler.

2. Preparation of the Pellets $G_0$ to $G_{29}$
General Methods for the Preparation of the Pellets According to the Invention
a. General "Syringe-Based" Method The bitumen is first heated to a heating temperature denoted $T_c$, initially of 150° C., then taken off under hot conditions by means of a syringe. Drops of bitumen are then deposited on a support covered with anti-agglomerating agent. If the shaping of the pellets is difficult at this initial temperature of 150° C., the bitumen is then heated to a higher temperature with incrementation of 10° C., until this shaping is possible. The bitumen drops are then left to cool to ambient temperature for 10 to 15 minutes. The drops of bitumen are then covered with anti-agglomerating agent, then passed through a sieve in order to remove any excess anti-agglomerating agent. Pellets of bitumen are obtained in this way.

The pellets $G_0$ to $G_7$ are prepared from the bitumens $B_0$ to $B_7$, respectively, according to the method a. described above, using talc as anti-agglomerating agent. The pellets $G_8$ are prepared from the bitumen $B_7$ according to the method a. described above, using siliceous fines as anti-agglomerating agent.

The heating temperatures $T_c$ of the bitumens $B_0$ to $B_7$ for the pellets $G_0$ to $G_8$ are listed in table 3 below.

TABLE 3

| | $B_0$ (control) | $B_1$ (control) | $B_2$ (control) | $B_3$ (control) | $B_4$ | $B_5$ | $B_6$ (control) | $B_7$ |
|---|---|---|---|---|---|---|---|---|
| $T_c$ (° C.) | 160 | 160 | 180 | 180 | 150 | 180 | 190 | 180 |

The heating temperature $T_c$ of the bitumens $B_0$ to $B_7$ of the pellets depends on the composition of the bitumen used. The heating temperature of the bitumens $B_4$, $B_5$, and $B_7$ is less than that of the bitumen bases $B_0$ and $B_1$ and of the bitumen $B_6$ comprising the copolymer SB. The bitumens $B_4$, $B_5$ and $B_7$ are easily shaped into pellets compared to the bitumens of the prior art.

b. General "Moulding" Method

The bitumen is reheated at 160° C. for two hours in an oven before being poured into a silicone mould having various spherically shaped holes so as to form the pellets of solid bitumen. After having noted the solidification of the bitumen in the mould, the surplus is leveled off with a blade heated on a Bunsen burner. After 30 minutes, the solid bitumen in the form of uncoated pellets is removed from the mould and stored in a tray covered with siliconized paper. The bitumen pellets are then left to cool to ambient temperature for 10 to 15 minutes. The pellets formed in this way are covered at their surface with an anti-agglomerating agent, optionally heated beforehand at a temperature of between 30° C. and 70° C. for 30 minutes, then passed through a sieve in order to remove excess anti-agglomerating agent.

The pellets $G_9$ and $G_{10}$ are prepared from the bitumen $B_9$ according to the method b. described above, using lignin heated beforehand at 70° C. for 30 min and pine needle powder heated beforehand at 70° C. for 30 min, respectively, as anti-agglomerating agent.

The uncoated pellets $G_{11}$ are prepared from the bitumen $B_8$ according to the method b. described above.

The pellets $G_{12}$, $G_{13}$ and $G_{14}$ are prepared from the bitumen $B_{10}$ according to the method b. described above, using siliceous fines, lignin heated beforehand at 70° C. for 30 min and pine needle powder heated beforehand at 70° C. for 30 min, respectively, as anti-agglomerating agent.

The pellets $G_{15}$ are prepared from the bitumens $B_{11}$ according to the method b. described above, using pine needle powder heated beforehand at 70° C. for 30 min as anti-agglomerating agent.

The pellets $G_{16}$, $G_{17}$ and $G_{18}$ are prepared from the bitumens $B_{12}$, $B_{13}$ and $B_{14}$ respectively, according to the method b. described above, using siliceous fines as anti-agglomerating agent.

The pellets $G_{19}$ and $G_{20}$ are prepared from the bitumen $B_{15}$ according to the method b. described above, using lignin heated beforehand at 70° C. for 30 min and siliceous fines, respectively, as anti-agglomerating agent.

The pellets $G_{21}$, $G_{22}$, $G_{23}$ and $G_{24}$ are prepared, respectively, from the bitumen $B_{17}$, $B_{19}$, $B_{19}$ and $B_{20}$ according to the method b. described above, using siliceous fines as anti-agglomerating agent.

The pellets $G_{25}$ are prepared from the bitumen $B_{21}$ according to the method b. described above, using siliceous fines as anti-agglomerating agent.

The pellets $G_{26}$ are prepared from the bitumen $B_{17}$ according to the method b. described above, using glass powder as anti-agglomerating agent.

The pellets $G_{27}$ are prepared from the bitumen $B_{22}$ according to the method b. described above, using glass powder as anti-agglomerating agent.

The pellets $G_{28}$ are prepared from the bitumen $B_{23}$ according to the method b. described above, using Fontainebleau sand as anti-agglomerating agent, respectively.

The pellets $G_{29}$ are prepared from the bitumen $B_{22}$ according to the method b. described above, using Fontainebleau sand as anti-agglomerating agent, respectively.

The percentage by weight of the coating for all the pellets $G_0$ to $G_{10}$ and $G_{12}$ to $G_{29}$ is approximately 1% by weight relative to the total weight of the bitumen of the pellets.

3. Load Resistance Test of Pellets $G_0$ to $G_{29}$

This test is carried out in order to evaluate the load resistance of the pellets $G_0$ to $G_{29}$ at a temperature of 50° C. under a compressive force. Indeed, this test makes it possible to simulate the conditions of temperature and compression of the pellets on one another to which they are subjected during transportation and/or storage in bulk in bags of from 10 to 30 kg or in Big Bags of from 500 to 1000 kg or in barrels of 200 kg, and to evaluate their resistance under these conditions.

The load resistance test is carried out using a texture analyser sold under the name LF Plus by the company Lloyd instruments and equipped with a thermal chamber. To do this, a metal container 25 mm in diameter, containing a weight of 10 g of bitumen pellets, is placed inside the thermal chamber regulated at a temperature of 50° C. for 3 hours. The piston of the texture analyser is a cylinder 20 mm in diameter and 60 mm high. The cylindrical piston is placed in contact with the top layer of the pellets at the start. It then moves vertically downward, at a constant speed of 0.1 mm/min, over a calibrated distance of 1 mm, so as to exert a compressive force on all of the pellets placed in the container. After withdrawal of the piston, the compression strength of the pellets is evaluated visually, especially their appearance and their ability to agglomerate. The observations are listed in table 4 below.

For the pellets $G_{17}$ and $G_{16}$, an additional creep resistance test is carried out under the same conditions as the load resistance test as described above, except for the fact that this test is carried out at 60° C. instead of 50° C.

TABLE 4

| | Pellets | | | | | | | | | | | | | |
|---|---|---|---|---|---|---|---|---|---|---|---|---|---|---|
| | $G_0$ (control) | $G_1$ (control) | $G_2$ (control) | $G_3$ (control) | $G_4$ | $G_5$ | $G_6$ (control) | $G_7$ | $G_8$ | $G_9$ | $G_{10}$ | $G_{11}$ (control) | $G_{12}$ | $G_{13}$ | $G_{14}$ |
| Load resistance at 50° C. | −− | −− | −− | − | ++ | +++ | −− | ++ | + | + | + | −− | + | + | + |

| | Pellets | | | | | | | | | | | | | |
|---|---|---|---|---|---|---|---|---|---|---|---|---|---|---|
| | $G_{15}$ | $G_{16}$ | $G_{17}$ | $G_{18}$ | $G_{19}$ | $G_{20}$ | $G_{21}$ | $G_{22}$ | $G_{23}$ | $G_{24}$ | $G_{25}$ | $G_{26}$ | $G_{27}$ | $G_{28}$ | $G_{29}$ |
| Load resistance at 50° C. | ++ | +++ | ++++ | ++++ | ++ | ++ | + | ++ | +++ | +++ | + | ++ | ++ | ++ | ++ |

| | Pellets | |
|---|---|---|
| | $G_{17}$ | $G_{18}$ |
| Load resistance at 60° C. | ++++ | ++++ |

++++: the pellets retain their initial shape and do not adhere to one another at a temperature of greater than or equal to 60° C.
+++: the pellets retain their initial shape and do not adhere to one another at a temperature of greater than or equal to 50° C.
++: the pellets do not adhere to one another, but no longer have their rounded shape.
+: the pellets adhere slightly to one another.
−: the pellets are quite fused.
−−: the pellets are fused.

The pellets $G_5$ and $G_7$ comprising the combination of hydrazide and the E/BA/GM terpolymer and covered with talc have a very good load resistance at 50° C. in so far as they retain their initial shape, as is the case with the pellets $G_{16}$, $G_{17}$, $G_{18}$, $G_{23}$ and $G_{24}$.

Moreover, the pellets $G_4$, $G_5$, $G_7$, $G_8$ to $G_{10}$ and $G_{12}$ to $G_{29}$ have good resistance to the compression and temperature conditions compared to the control pellets $G_0$, $G_1$, $G_2$, $G_3$, $G_6$ and $G_{11}$ which agglomerate or fuse during the transportation or storage thereof, especially at temperatures of greater than or equal to 50° C. Thus, handling said pellets $G_0$, $G_1$, $G_2$, $G_3$, $G_6$ and $G_{11}$ is less easy compared to the pellets $G_4$, $G_5$, $G_7$, $G_8$ to $G_{10}$ and $G_{12}$ to $G_{29}$. Advantageously, the pellets $G_{17}$ and $G_{16}$ have excellent load resistance at 60° C. in so far as they retain their initial shape, unlike the pellets $G_{11}$ which fuse during the load resistance test at 50° C.

In particular, if the bitumen pellets are transported in bags or Big Bags, the agglomerated and/or fused pellets $G_0$, $G_1$, $G_2$, $G_3$, $G_6$ and $G_{11}$ have a risk of leaking out of the bags or Big Bags, making said bags or Big Bags, which will have a tendency to stick to one another, difficult to handle.

The invention claimed is:
1. Bitumen pellets consisting essentially of:
one or more bitumen bases,
between 0.1% and 5% by weight of at least one chemical additive chosen from:

a compound of general formula (I): $R^1$—(COOH)$_z$ wherein $R^1$ is a linear or branched, saturated or unsaturated hydrocarbon-based chain comprising from 4 to 68 carbon atoms, and z is an integer ranging from 1 to 4, or a compound of general formula (II): R—(NH)$_n$CONH—(X)$_m$—NHCO(NH)$_n$—R' wherein:

R and R', which are identical or different, contain a saturated or unsaturated, linear or branched, cyclic or acyclic hydrocarbon-based chain having from 1 to 22 carbon atoms and optionally comprising heteroatoms and/or rings having from 3 to 12 atoms and/or heterocycles having from 3 to 12 atoms;

X contains a saturated or unsaturated, linear or branched, cyclic or acyclic hydrocarbon-based chain having from 1 to 22 carbon atoms and optionally comprising one or more heteroatoms and/or rings having from 3 to 12 atoms and/or heterocycles having from 3 to 12 atoms;

n and m are integers having, independently of one another, a value of 0 or of 1, optionally, between 0.5% and 15% by weight of an anti-agglomerating agent, optionally, between 0.05% and 15% by weight of an olefinic polymer adjuvant, the percentages being given by weight with respect to the total weight of the bitumen pellets, wherein the bitumen pellets have a penetrability of between 20 and 45 1/10 mm and a ring and ball softening temperature (RBT) of greater than 90° C., it being understood that the penetrability is measured at 25° C. according to standard EN 1426 and the RBT according to standard EN 1427.

2. Bitumen pellets according to claim 1, wherein said chemical additive is a compound of general formula (I) and is a diacid of general formula HOOC—$C_wH_{2w}$—COOH, wherein w is an integer ranging from 4 to 22.

3. Bitumen pellets according to claim 2, wherein said diacid is chosen from the group consisting of adipic acid, pimelic acid, suberic acid, azelaic acid, sebacic acid, undecanedioic acid, 1,2-dodecanedioic acid and tetradecanedioic acid.

4. Bitumen pellets according to claim 2, wherein said diacid is sebacic acid.

5. Bitumen pellets according to claim 1, wherein the chemical additive is a compound of general formula (II) comprising a hydridize unit when n and m have a value of 0.

6. Bitumen pellets according to claim 5, wherein said R and/or R' groups, which are identical or different, comprise one or more aromatic monocyclic or polycyclic rings or heterocycles, optionally substituted by one or more hydroxyl functions and/or one or more saturated, linear or branched hydrocarbon-based chains, having from 1 to 6 carbon atoms.

7. Bitumen pellets according to claim 5, wherein said R and/or R' groups, which are identical or different, comprise an aliphatic hydrocarbon-based chain having 4 to 22 carbon atoms.

8. Bitumen according to claim 7, wherein said aliphatic hydrocarbon-based chain is chosen from the groups $C_4H_9$, $C_5H_{11}$, $C_9H_{19}$, $C_{11}H_{23}$, $C_{12}H_{25}$, $C_{17}H_{35}$, $C_{18}H_{37}$, $C_{21}H_{43}$, $C_{22}H_{45}$.

9. Bitumen pellets according to claim 5, wherein said X group comprises an aliphatic hydrocarbon-based chain having 1 to 2 carbon atoms.

10. Bitumen pellets according to claim 1, wherein the chemical additive is a compound of general formula (II) comprising two amide units when n has a value of 0 and m has a value of 1.

11. Bitumen pellets according to claim 1, wherein the olefinic polymer adjuvant is present and is functionalized by at least glycidyl functional groups.

12. Bitumen pellets according to claim 11, wherein said olefinic polymer adjuvant is chosen from the group consisting of:
(a) random or block copolymers of ethylene and of a monomer chosen from glycidyl acrylate and glycidyl methacrylate, comprising from 50% to 99.7% by weight of ethylene;
(b) random or block terpolymers of ethylene, of a monomer A chosen from vinyl acetate and $C_1$ to $C_6$ alkyl acrylates or methacrylates and of a monomer B chosen from glycidyl acrylate and glycidyl methacrylate, comprising from 0.5% to 40% by weight of units derived from the monomer A and from 0.5% to 15% by weight of units derived from the monomer B, the remainder being formed of units derived from the ethylene; and
(c) copolymers resulting from the grafting of a monomer B, chosen from glycidyl acrylate and glycidyl methacrylate, to a substrate consisting of a polymer chosen from polyethylenes, polypropylenes, random or block copolymers of ethylene and of vinyl acetate and random or block copolymers of ethylene and of $C_1$ to $C_6$ alkyl acrylate or methacrylate, comprising from 40% to 99.7% by weight of ethylene, said grafted copolymers comprising from 0.5% to 15% by weight of grafted units derived from the monomer B.

13. Bitumen pellets according to claim 12, wherein said olefinic polymer adjuvant is chosen from the terpolymers (b).

14. Bitumen pellets according to claim 13, wherein said olefinic polymer adjuvant is chosen from the random terpolymers.

15. Bitumen pellets according to claim 1, wherein the at least one anti-agglomerating agent is present.

16. Bitumen pellets according to claim 15, in which the anti-agglomerating agent is present and is chosen from talc; fines; sand; cement; carbon; wood residues; glass powder; clays; alumina; silica; silica derivatives; plastic powder; lime; plaster; rubber powder; powder of polymers; and mixtures thereof.

17. Bitumen pellets according to claim 1, wherein the at least one anti-agglomerating agent is present and said pellets are covered over at least a portion of their surface with the anti-agglomerating agent.

18. Bitumen pellets according to claim 1, wherein the penetrability of the bitumen pellets is between 20 and 37 $\frac{1}{10}$ mm.

19. Bitumen pellets according to claim 1, wherein the ring and ball softening temperature (RBT) is greater or equal to 95° C.

20. Bitumen pellets according to claim 1, wherein the pellets are prepared from a road bitumen, said road bitumen is being prepared by bringing into contact:
one or more bitumen bases, and
between 0.1% and 5% by weight of a chemical additive.

21. Bitumen pellets according to claim 20, wherein the pellets are prepared from a road bitumen, said road bitumen being prepared by bringing into contact:
one or more bitumen bases,
between 0.1% and 5% by weight of a chemical additive, and between 0.05% and 15% by weight of an olefinic polymer adjuvant.

22. Bitumen pellets according to claim 20, wherein the bitumen pellets are prepared from road bitumen, said road bitumen being prepared by bringing into contact:
one or more bitumen bases,
between 0.1% and 5% by weight of a chemical additive relative to the total weight of bitumen of said pellets, and
between 0.5% and 20% by weight of an anti-agglomerating agent relative to the total weight of bitumen of said pellets.

23. Bitumen pellets according to claim 1, wherein the at least one chemical additive acts to reduce agglomeration or fusing of the bitumen pellets during transportation or storage thereof.

24. Bitumen pellets according to claim 23, wherein the at least one chemical additive acts to reduce agglomeration or fusing of the bitumen pellets during transportation or storage thereof at a temperature of 50° C. for 3 hours.

25. Process for transporting and/or storing road bitumen under cold conditions, said method comprising:
providing the road bitumen pellets according to claim 1, and
transporting and/or storing the road bitumen pellets.

26. Process according to claim 25, the road bitumen pellets are transported and/or stored at a temperature of less than 100° C.

* * * * *